United States Patent
Dziech

(10) Patent No.: US 10,753,232 B2
(45) Date of Patent: Aug. 25, 2020

(54) ASSEMBLIES AND METHODS FOR COOLING FLOWPATH SUPPORT STRUCTURE AND FLOWPATH COMPONENTS

(71) Applicant: General Electric Company, Schenectady, NY (US)

(72) Inventor: Aaron Michael Dziech, Crittenden, KY (US)

(73) Assignee: General Electric Company, Schenectady, NY (US)

( * ) Notice: Subject to any disclaimer, the term of this patent is extended or adjusted under 35 U.S.C. 154(b) by 320 days.

(21) Appl. No.: 15/625,465

(22) Filed: Jun. 16, 2017

(65) Prior Publication Data

US 2018/0363502 A1    Dec. 20, 2018

(51) Int. Cl.
| | | |
|---|---|---|
| *F01D 25/24* | (2006.01) | |
| *F01D 25/12* | (2006.01) | |
| *F01D 9/04* | (2006.01) | |
| *F01D 25/14* | (2006.01) | |
| *F01D 9/06* | (2006.01) | |

(52) U.S. Cl.
CPC ............. *F01D 25/243* (2013.01); *F01D 9/04* (2013.01); *F01D 9/065* (2013.01); *F01D 25/12* (2013.01); *F01D 25/14* (2013.01); *F01D 25/246* (2013.01); *F05D 2220/32* (2013.01); *F05D 2240/15* (2013.01); *F05D 2260/30* (2013.01); *F05D 2260/606* (2013.01); *F05D 2300/6033* (2013.01)

(58) Field of Classification Search
CPC ...... F01D 25/243; F01D 25/246; F01D 9/065; F01D 25/14; F01D 9/04; F01D 25/12; F05D 2240/15; F05D 2260/606; F05D 2260/30; F05D 2300/6033; F05D 2220/32; F02C 7/20; F02C 7/18
See application file for complete search history.

(56) References Cited

U.S. PATENT DOCUMENTS

| | | | | |
|---|---|---|---|---|
| 3,583,824 A | * | 6/1971 | Smuland | F01D 11/18 415/117 |
| 4,157,232 A | * | 6/1979 | Bobo | F01D 11/08 415/116 |
| 4,173,120 A | * | 11/1979 | Grosjean | F01D 5/186 415/115 |
| 4,752,184 A | | 6/1988 | Liang | |

(Continued)

*Primary Examiner* — Hung Q Nguyen
(74) *Attorney, Agent, or Firm* — Dority & Manning, P.A.

(57) ABSTRACT

Retention assemblies and retention assembly cooling methods are provided. An exemplary retention assembly comprises an annular baffle, an annular attachment bracket comprising a gas turbine engine component, and first and second cooling passages defined by the baffle and attachment bracket. The first cooling passage is configured to receive a first airflow and the second cooling passage is configured to receive a second airflow. The first airflow has a lower pressure than the second airflow. An exemplary method comprises flowing a first airflow to a first cooling passage defined by a baffle and an attachment bracket of a retention assembly, and flowing a second airflow to a second cooling passage defined by the baffle and the attachment bracket. The second cooling passage is separate from the first cooling passage. The first airflow cools radially outward structures of the retention assembly, and the attachment bracket comprises a CMC component.

16 Claims, 3 Drawing Sheets

(56) References Cited

U.S. PATENT DOCUMENTS

| | | | |
|---|---|---|---|
| 5,015,540 | A | 5/1991 | Borom et al. |
| 5,167,487 | A | 12/1992 | Rock |
| 5,330,854 | A | 7/1994 | Singh et al. |
| 5,336,350 | A | 8/1994 | Singh |
| 5,628,938 | A | 5/1997 | Sangeeta et al. |
| 6,024,898 | A | 2/2000 | Steibel et al. |
| 6,200,091 | B1 * | 3/2001 | Bromann ............... F01D 11/18 415/173.1 |
| 6,258,737 | B1 | 7/2001 | Steibel et al. |
| 6,403,158 | B1 | 6/2002 | Corman |
| 6,503,441 | B2 | 1/2003 | Corman et al. |
| 8,147,192 | B2 | 4/2012 | Jones et al. |
| 8,622,693 | B2 | 1/2014 | DiPaola et al. |
| 8,998,573 | B2 | 4/2015 | Albers et al. |
| 2004/0067316 | A1 | 4/2004 | Gray et al. |
| 2012/0251314 | A1 * | 10/2012 | Beaujard ............... F01D 5/282 415/209.3 |
| 2014/0004293 | A1 | 1/2014 | Grooms, II et al. |
| 2014/0227088 | A1 * | 8/2014 | Beaujard ............... F01D 5/282 415/173.4 |
| 2016/0333741 | A1 | 11/2016 | Stapleton |

\* cited by examiner

ASSEMBLIES AND METHODS FOR COOLING FLOWPATH SUPPORT STRUCTURE AND FLOWPATH COMPONENTS

FIELD

The present subject matter relates generally to retention assemblies for gas turbine engine components. More particularly, the present subject matter relates to assemblies and methods for cooling gas turbine engine flowpath support structures and flowpath components.

BACKGROUND

More commonly, non-traditional high temperature composite materials, such as ceramic matrix composite (CMC) materials, are being used in applications such as gas turbine engines. Components fabricated from CMC materials have a higher temperature capability compared with typical components, e.g., metal components, which may allow improved component performance and/or increased system temperatures. Generally, gas turbine engines include combustion sections in which compressed air is mixed with a fuel and ignited to generate high pressure, high temperature combustion gases that then flow downstream and expand to drive a turbine section coupled to a compressor section, a fan section, and/or a load device. Components within the gas flow must be adequately restrained to ensure the components remain in their proper location within the flowpath. However, typical attachment methods and assemblies often expose the structure for supporting and securing the flowpath components to relatively high temperatures, e.g., from relatively high pressure purge flow and the combustion gases. Often, the support structure comprises metallic components, which are less capable of withstanding high temperatures than CMC components and that have different coefficients of thermal expansion (CTE) than CMC components. Therefore, exposing the metallic support structure to the relatively high flowpath and purge flow temperatures risks overheating the metallic support structure and losing clamp load between the metallic support structure and CMC attachment assembly hardware, as well as other detrimental effects from the CTE mismatch between the metallic and CMC attachment hardware.

Accordingly, improved retention assemblies and cooling methods that protect the metallic support structure from relatively high purge flow and flowpath temperatures would be desirable. As an example, a retention assembly for securing CMC components to one or more metallic supporting components that utilizes a lower temperature cooling airflow passage and a separate higher temperature purge or cooling airflow passage would be beneficial.

BRIEF DESCRIPTION

Aspects and advantages of the invention will be set forth in part in the following description, or may be obvious from the description, or may be learned through practice of the invention.

In one exemplary embodiment of the present subject matter, a retention assembly for a component of a gas turbine engine is provided. The retention assembly comprises an annular baffle, an annular attachment bracket comprising the component, a first cooling passage defined by the baffle and the attachment bracket, and a second cooling passage defined by the baffle and the attachment bracket. The first cooling passage is configured to receive a first airflow and the second cooling passage is configured to receive a second airflow. The first airflow has a lower pressure than the second airflow.

In another exemplary embodiment of the present subject matter, a retention assembly for a ceramic matrix composite (CMC) component of a gas turbine engine is provided. The retention assembly comprises an annular CMC baffle having a first member and a second member. The first member extends radially and the second member extends axially from the first member. The retention assembly also comprises an annular CMC attachment bracket comprising the CMC component. The CMC attachment bracket has a first segment, a second segment, and a third segment. The first segment extends axially, the second segment extends radially from the first segment, and the third segment extends axially from the second segment. A first cooling passage is defined by the first and second members of the CMC baffle and the first and second segments of the CMC attachment bracket. A second cooling passage is defined by the second member of the CMC baffle and the second and third members of the CMC attachment bracket. The first cooling passage is configured to receive a first airflow, and the second cooling passage is configured to receive a second airflow. The first airflow has a lower pressure than the second airflow.

In a further exemplary embodiment of the present subject matter, a method for cooling a retention assembly for a ceramic matrix composite (CMC) component of a gas turbine engine is provided. The method comprises flowing a first airflow to a first cooling passage defined by a baffle and an attachment bracket of the retention assembly, and flowing a second airflow to a second cooling passage defined by the baffle and the attachment bracket. The second cooling passage is separate from the first cooling passage. The first airflow cools radially outward structures of the retention assembly, and the attachment bracket comprises the CMC component.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
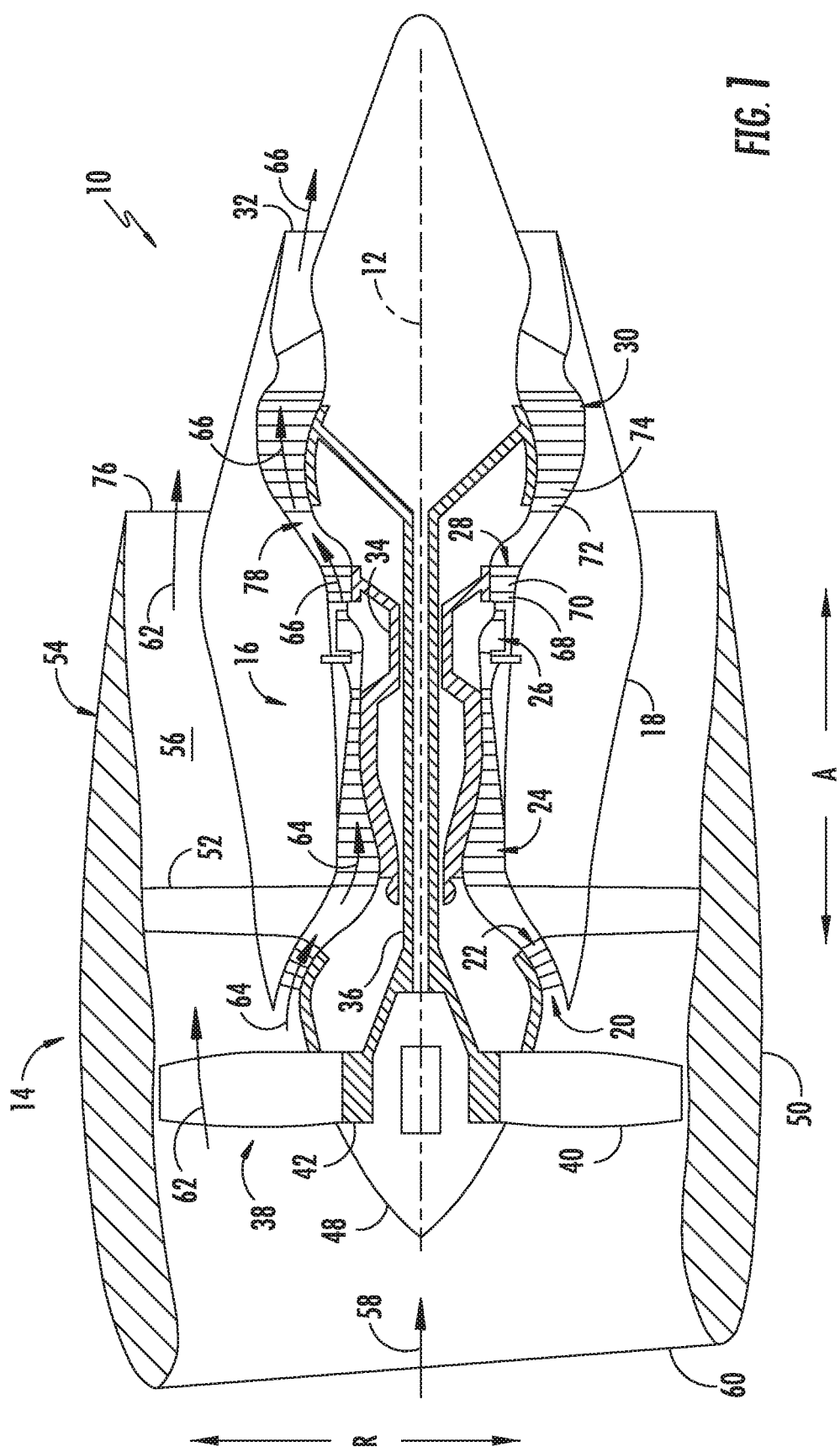
FIG. 1 provides a schematic cross-section view of an exemplary gas turbine engine according to various embodiments of the present subject matter.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first," "second," and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows and "downstream" refers to the direction to which the fluid flows.

Referring now to the drawings, wherein identical numerals indicate the same elements throughout the figures, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal centerline 12 provided for reference) and a radial direction R. In general, the turbofan 10 includes a fan section 14 and a core turbine engine 16 disposed downstream from the fan section 14.

The exemplary core turbine engine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22. In other embodiments of turbofan engine 10, additional spools may be provided such that engine 10 may be described as a multi-spool engine.

For the depicted embodiment, fan section 14 includes a fan 38 having a plurality of fan blades 40 coupled to a disk 42 in a spaced apart manner. As depicted, fan blades 40 extend outward from disk 42 generally along the radial direction R. The fan blades 40 and disk 42 are together rotatable about the longitudinal axis 12 by LP shaft 36. In some embodiments, a power gear box having a plurality of gears may be included for stepping down the rotational speed of the LP shaft 36 to a more efficient rotational fan speed.

Referring still to the exemplary embodiment of FIG. 1, disk 42 is covered by rotatable front nacelle 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the core turbine engine 16. It should be appreciated that nacelle 50 may be configured to be supported relative to the core turbine engine 16 by a plurality of circumferentially-spaced outlet guide vanes 52. Moreover, a downstream section 54 of the nacelle 50 may extend over an outer portion of the core turbine engine 16 so as to define a bypass airflow passage 56 therebetween.

During operation of the turbofan engine 10, a volume of air 58 enters turbofan 10 through an associated inlet 60 of the nacelle 50 and/or fan section 14. As the volume of air 58 passes across fan blades 40, a first portion of the air 58 as indicated by arrows 62 is directed or routed into the bypass airflow passage 56 and a second portion of the air 58 as indicated by arrows 64 is directed or routed into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the core turbine engine 16.

It will be appreciated that, although described with respect to turbofan 10 having core turbine engine 16, the present subject matter may be applicable to other types of turbomachinery. For example, the present subject matter may be suitable for use with or in turboprops, turboshafts, turbojets, industrial and marine gas turbine engines, and/or auxiliary power units.

Figure 2:
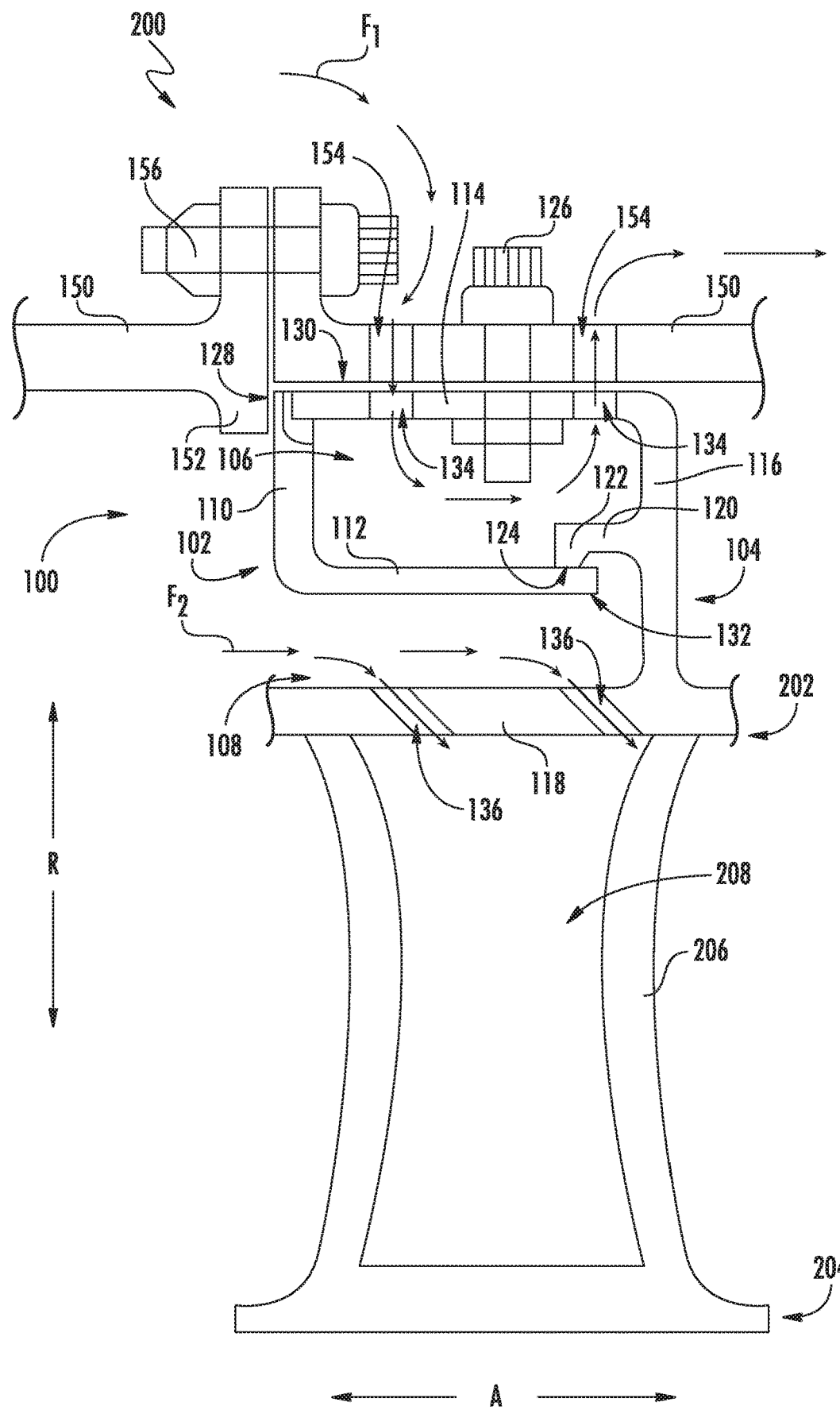
FIG. 2 provides a schematic cross-sectional view of a portion of a flowpath assembly of a gas turbine engine according to an exemplary embodiment of the present subject matter.

FIG. 2 provides a schematic cross-sectional view of a portion of a flowpath assembly of a gas turbine engine according to an exemplary embodiment of the present subject matter. The flowpath assembly 200 includes a retention assembly 100 for a gas turbine engine component, such as a component within the hot gas path 78 of the turbine engine 16, according to an exemplary embodiment of the present subject matter. As shown in FIG. 2, the retention assembly 100 includes a baffle 102 and an attachment bracket 104. It will be appreciated that the baffle 102 and attachment bracket 104 may be generally annular in shape, extending about an annular flowpath through the gas turbine engine. For instance, the annular baffle 102 and annular attachment bracket 104 may extend about the hot gas path 78, which extends through the combustor (not shown), HP turbine section 28, LP turbine section 30, and jet exhaust section 32 of the engine 16 as described above. As further illustrated in FIG. 2, the baffle 102 and attachment bracket 104 define a first cooling passage 106 and a second cooling passage 108. The second cooling passage 108 is defined radially inward of the first cooling passage 106. The first cooling passage 106 is configured to receive a first airflow $F_1$, and the second cooling passage 108 is configured to receive a second airflow $F_2$. Further, the attachment bracket 104 is attached to a casing 150 of the gas turbine engine and comprises a component, or a plurality of components, of the gas turbine engine, such that the retention assembly 100 secures and locates the component(s) within the flowpath. As described in greater detail herein, the first airflow $F_1$ helps cool the attachment bracket 104, the casing 150, and the attachment mechanism used to attach the bracket 104 to the casing 150, i.e., the radially outward structures of the retention assembly 100, while the second airflow $F_2$ provides a purge or cooling airflow to the components within the flowpath.

In some embodiments, the baffle 102 and attachment bracket 104 may be single piece structures that each extend in a full 360°, generally annular ring about the flowpath. In other embodiments, the baffle 102 and attachment bracket 104 each may be formed from a plurality of sections. For example, the annular baffle 102 may be formed from a plurality of baffle sections 102a, 102b, etc., that are positioned circumferentially adjacent one another. Similarly, the annular attachment bracket 104 may be formed from a plurality of attachment bracket sections 104a, 104b, etc., that are positioned circumferentially adjacent one another.

Continuing with FIG. 2, the baffle 102 shown in the exemplary embodiment has a first member 110 and a second member 112. The first member 110 extends generally radially, i.e., generally along the radial direction R, and the second member 112 extends generally axially, i.e., generally along the axial direction A, from the first member 110. More particularly, the first member 110 extends radially outward with respect to the second member 112. Preferably, the baffle 102 is formed from a ceramic matrix composite (CMC) material, but in appropriate embodiments, the baffle 102 may be formed from a metallic material, such as a metal or metal alloy, or any other suitable material. For instance, some embodiments of the gas turbine engine may have low enough system temperatures such that a metallic baffle 102 rather than a CMC baffle 102 may be used.

Referring still to FIG. 2, the exemplary attachment bracket 104 has a first segment 114, a second segment 116, and a third segment 118. The first segment 114 extends generally axially, i.e., generally along the axial direction A. The second segment 116 extends generally radially, i.e., generally along the radial direction R, from the first segment 114. The third segment 118 extends generally axially from the second segment 116. More specifically, the third segment 118 extends along the axial direction A generally parallel to the first segment 114, with the second segment 116 extending along the radial direction R from the first segment 114 to the third segment 118. Further, the second segment 116 of the attachment bracket 104 includes an axially extending arm 120. The arm 120 defines a protrusion 122 having a protrusion surface 124 that interfaces with the baffle second member 112, i.e., the baffle second member 112 is in contact with the arm 120 via the protrusion 122.

In exemplary embodiments, the attachment bracket 104 is formed from a ceramic matrix composite (CMC) material. In such embodiments, the protrusion 120 is formed from a buildup of CMC plies, e.g., a CMC ply stack or a plurality of CMC plies laid up with the CMC material forming the arm 120 of the attachment bracket 104. The buildup may be machined to define the protrusion 122, as well as the protrusion surface 124. That is, the buildup of CMC plies provides machining stock for defining the protrusion 122 and the protrusion surface 124, such that the surface 124 may be a machined, substantially flat surface. As shown in FIG. 2, the protrusion surface 124 is an interface surface for the baffle 102 and the attachment bracket 104. In embodiments in which the protrusion surface 124 is a machined surface, the interface between the baffle 102 and attachment bracket 104 is a machined interface, which may help transfer the load from the baffle 102 and into the attachment bracket 104.

Keeping with FIG. 2, the attachment bracket 104 is attached to the casing 150, and the casing 150 may comprise one or more sections that are attached to one another. The attachment bracket 104 may be attached to the casing 150 using one or more bolts 126, as depicted in the exemplary embodiment, or the attachment bracket 104 may be attached to the casing 150 using any other suitable fasteners or attachment mechanisms. Similarly, the sections of casing 150 may be attached to one another using one or more bolts 156 or any other suitable fasteners or attachment mechanisms. It will be appreciated that the bolt 126 illustrated in FIG. 2 is received in an aperture defined in the casing 150 and an aperture defined in the attachment bracket 104, and that a casing aperture and corresponding bracket aperture may be defined for each bolt 126 used to attach the attachment bracket 104 to the casing 150. A grommet or the like may be used in each aperture of the attachment bracket 104, particularly in embodiments in which the attachment bracket 104 is formed from a CMC material to help reduce or prevent wear and/or binding of the attachment bracket 104. That is, a grommet may allow the CMC attachment bracket 104 to move with respect to the bolt 126, which may have a different coefficient of thermal expansion than the CMC attachment bracket 104. As such, allowing the bracket 104 to move with respect to the bolt 126 prevents or reduces the effects of the thermal mismatch between the bolt 126 and bracket 104.

Further, a first end 128 of the first member 110 of the baffle 102 is disposed between a first end 130 of the first segment 114 of the attachment bracket 104 and a radially extending flange 152 of the casing 150. As previously described, the second member 112 of the baffle 102 is in contact with the arm 120 extending from the second segment 116 of the attachment bracket 104. More particularly, a second end 132 of the baffle second member 112 is in contact with the protrusion 122 from the arm 120. As such, the attachment bracket 104 and casing 150 secure the baffle 102 in place within the retention assembly 100. Moreover, the contact between the second end 132 of the baffle second member 112 and the protrusion 122 of the arm 120 helps prevent or reduce leakage from the higher pressure second cooling passage 108 to the lower pressure first cooling passage 106, which are described in greater detail below.

Figure 3:
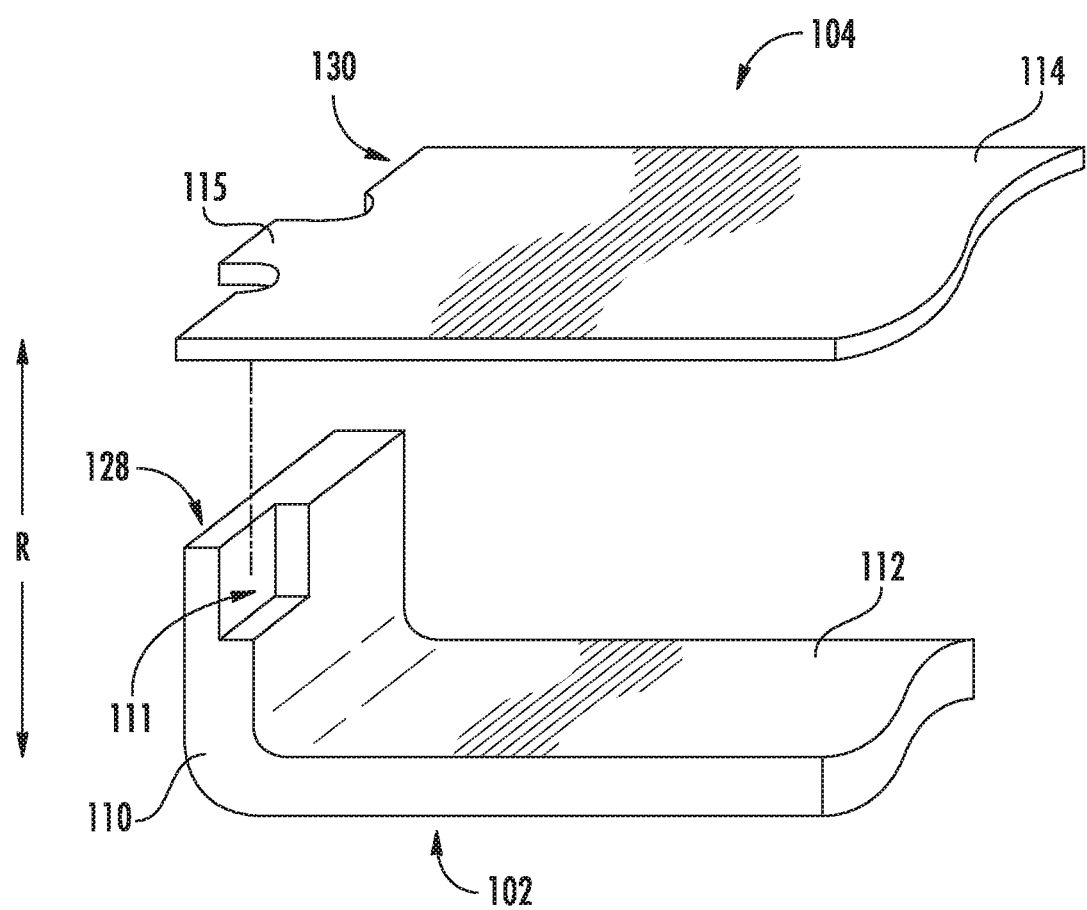
FIG. 3 provides a side, perspective view of a portion of a baffle and an attachment bracket of the flowpath assembly of FIG. 2, according to an exemplary embodiment of the present subject matter.

As further illustrated in FIGS. 2 and 3, the baffle 102 and attachment bracket 104 include an anti-rotation feature that helps hold the baffle 102 in a proper position. More particularly, the attachment bracket first segment 114 includes a rib 115 at the first end 130 that is received within a slot 111 defined in the first end 128 of baffle first member 110 to help prevent rotation of the baffle 102. As described above, the baffle 102 may be formed from a plurality of baffle sections and, in such embodiments, each baffle section may include a slot 111 that receives one of a plurality of ribs 115 of the attachment bracket 104. Similarly, in some embodiments, the attachment bracket 104 may be formed from a plurality of attachment bracket sections, such that each attachment bracket section includes a rib 115 that is received in one of a plurality of slots 111 of the baffle 102. In other embodiments, the retention assembly 100 may include a plurality of baffle sections and a plurality of attachment bracket sections, and each baffle section may define a slot 111 and each attachment bracket section may include a rib 115 such that one of the ribs 115 is received in each slot 111.

As also illustrated in FIG. 2, the first segment 114 of the attachment bracket 104 defines at least two first bracket openings 134. Similarly, the casing 150 defines at least two casing openings 154, and the first bracket openings 134 are aligned with the casing openings 154. As shown by the arrows depicting the first airflow $F_1$, the first bracket openings 134 and casing openings 154 allow the ingress of the first airflow $F_1$ into the first cooling passage 106, as well as the egress of the first airflow $F_1$ from the first cooling passage 106. Further, the attachment bracket 104 defines one or more second bracket openings 136, which, as shown by the arrows depicting the second airflow $F_2$, allows the second airflow $F_2$ to egress from the second cooling passage 108. For example, the second airflow $F_2$ may egress into a flowpath, or directly into one or more components disposed within the flowpath, to cool components within the flowpath. The second airflow $F_2$ also may be used as purge airflow.

In the illustrated embodiment, the flowpath is the hot gas path 78 through the core turbine engine 16 of FIG. 1. As shown in FIG. 2, an annular outer boundary 202 and an annular inner boundary 204 define the flowpath, i.e., the hot gas path 78. The casing 150, which is the outer casing 18 of the engine 16 depicted in FIG. 1, circumferentially surrounds the outer boundary 202 and the inner boundary 204. Further, the flowpath assembly 200 includes a turbine nozzle 206 disposed within the flowpath 78. It will be appreciated that, although not depicted in FIG. 2, the flowpath assembly 200 comprises a plurality of turbine nozzles 206, which are circumferentially spaced apart from one another about the axial centerline 12 to form an annular array of nozzles 206 disposed within the flowpath 78. Each turbine nozzle 206 extends from the outer flowpath boundary 202 to the inner flowpath boundary 204. Thus, with respect to the turbine nozzles 206, the outer boundary 202 is defined by an outer band of the nozzles, and the inner boundary 204 is defined by an inner band of the nozzles.

In the exemplary embodiment, each turbine nozzle 206 is formed from a ceramic matrix composite (CMC) material, such that a plurality of CMC components is disposed within the flowpath 78. As further illustrated in FIG. 2, the retention assembly 100 described above is used to secure the plurality of turbine nozzles 206 to the casing 150 such that the nozzles 206 are secured within the flowpath assembly 200. In particular, the attachment bracket 104 of the retention assembly 100 comprises the turbine nozzles 206, such that the securing of the attachment bracket 104 to the casing 150 secures the turbine nozzles 206 within the flowpath assembly 200. As previously described, the attachment bracket 104 may be formed from a plurality of attachment bracket sections. Each attachment bracket section 104a, 104b, etc., of the plurality of attachment bracket sections may comprise at least one turbine nozzle 206. In some embodiments, the number of attachment bracket sections is equal to the number of turbine nozzles 206, i.e., one attachment bracket sections is used to secure one turbine nozzle 206. In other embodiments, one attachment bracket section comprises more than one turbine nozzle 206, e.g., two, three, or more nozzles 206, such that one attachment bracket section secures more than one turbine nozzle 206 within the flowpath assembly 200. In some embodiments, the turbine nozzles 206 are attached or coupled to a single piece attachment bracket 104 or to attachment bracket sections that form an annular attachment bracket 104. In other embodiments, the turbine nozzles 206 are integrally formed with the attachment bracket 104 or attachment bracket sections. For instance, the turbine nozzles 206 may be integrally formed with a single piece attachment bracket 104 from a CMC material, or one or more turbine nozzles 206 may be integrally formed with an attachment bracket section from a CMC material and, as described, the attachment bracket sections positioned adjacent one another to form an annular attachment bracket 104.

As shown in FIG. 2, the turbine nozzle 206 defines a cavity 208. In the exemplary embodiment, the second bracket opening 136 allows the second airflow $F_2$ to flow into the cavity 208. It will be appreciated that each turbine nozzle 206 of the plurality of turbine nozzles 206 may define a cavity 208 and that a second bracket opening 136 may be defined adjacent each turbine nozzle 206 to allow the second airflow $F_2$ to flow into the cavity 208 of each of the plurality of turbine nozzles 206. In other embodiments, the second bracket opening(s) 136 may be defined upstream of the turbine nozzle(s) 206, e.g., to provide a flow of cooling air at a leading edge of the turbine nozzle(s) 206. In still other embodiments, the attachment bracket 104 may comprise other flowpath components, such as a shroud positioned radially outward of a plurality of turbine rotor blades, and the second bracket opening(s) 136 may provide cooling to such other flowpath components.

Notably, the first airflow $F_1$ has a lower pressure and lower temperature than the second airflow $F_2$. For instance, the first airflow $F_1$ comprises discharge air from a first location in the compressor section of the gas turbine engine 16, and the second airflow $F_2$ comprises discharge air from a second location in the compressor section. The second location is downstream of the first location such that the second airflow $F_2$ is at a higher pressure and temperature than the first airflow $F_1$. As one example, the first location may be the LP compressor section 22 and the second location may be the HP compressor section 24.

Accordingly, the lower pressure and lower temperature first airflow $F_1$ through the first cooling passage 106 helps cool the support structure of the flowpath assembly 200. In particular, the first airflow $F_1$ helps cool the casing 150 and bolt(s) 126, which may be formed from a metallic material, such as a metal or metal alloy, while the attachment bracket 104 is formed from a high temperature CMC material. As such, the casing 150 and bolt(s) 126 are more susceptible to the effects of the relatively high temperatures of the combustion gases 66 flowing through hot gas path 78, but providing the cooling airflow $F_1$ helps minimize the impacts of the high temperatures. Moreover, the baffle 102 further separates and shields the metallic support structure from the higher pressure and higher temperature second airflow $F_2$, as well as the hot gas flowpath 78 temperatures. As shown in FIG. 2, the second member 112 of the baffle 102 separates the first cooling passage 106 and first airflow $F_1$ from the second cooling passage 108 and second airflow $F_2$. Thus, the baffle second member 112 and the first cooling passage 106 separate and shield the metallic support structure from the second airflow $F_2$ and the baffle second member 112, the first cooling passage 106, and the second cooling passage 108 separate and shield the metallic support structure from the hot gases within the flowpath 78. Further, although at a higher temperature than the first airflow $F_1$, the second airflow $F_2$ may provide cooling airflow to the components within the hot gas flowpath 78, such as the turbine nozzle 206 illustrated in FIG. 2.

Therefore, as described herein, the present subject matter also provides methods for cooling a retention assembly for a CMC component of a gas turbine engine. For example, a method for cooling the retention assembly 100 includes first installing the retention assembly within a turbine section of the gas turbine engine, such as the HP turbine section 28 or the LP turbine section 30 of gas turbine engine 16. The attachment bracket 104 of the retention assembly 100 comprises one or more CMC components that extend within a flowpath of the turbine section, such as hot gas path 78. Further, in some embodiments, installing the retention assembly 100 within the turbine section comprises bolting the attachment bracket 104 to the casing 150 of the gas turbine engine, e.g., using one or more bolts 126. After the retention assembly 100 is installed, the method comprises flowing the first airflow $F_1$ to the first cooling passage 106, which is defined by the baffle 102 and the attachment bracket 104 of the retention assembly 100. The method also includes flowing the second airflow $F_2$ to the second cooling passage 108, which also is defined by the baffle 102 and the attachment bracket 104 and is separate from the first cooling passage 106. The first airflow $F_1$ has a lower pressure and a lower temperature than the second airflow $F_2$. Thus, in some embodiments, flowing the first airflow $F_1$ to the first cooling passage 106 comprises flowing discharge air from a first location in a compressor section of the gas turbine engine, and flowing the second airflow $F_2$ to the second cooling passage 108 comprises flowing discharge air from a second location in the compressor section, where the second location is downstream of the first location. As an example, the first location is within the LP compressor section 22 of engine 16 while the second location is within the HP compressor section 24 of engine 16. Alternatively, the first and second locations may be within the same compressor section 22 or 24, but the first location is at an upstream stage with respect to the second location. In particular, the first airflow $F_1$ helps cool the metallic support structure, such as the casing 150, but also may help cool the baffle 102 and attachment bracket 104. The second airflow F2 particularly helps cool the components within the flowpath as described herein, but the second airflow F2 also helps cool the retention assembly 100 and support structure, e.g., by providing a buffer between the retention assembly 100 and support structure and the relatively hot temperatures of the flowpath.

As described herein, the baffle 102, attachment bracket 104, and flowpath components, such as turbine nozzles 206, may be formed from a ceramic matrix composite (CMC) material, which is a non-metallic material having high temperature capability. It may be particularly useful to utilize CMC materials in or near the hot gas path 78 due to the relatively high temperatures of the combustion gases 66, and the use of CMC materials within the flowpath assembly 200 may allow reduced cooling airflow to the CMC components and higher combustion temperatures, as well as other benefits and advantages. However, other components of the turbofan engine 10, such as components of HP compressor 24, HP turbine 28, and/or LP turbine 30, also may comprise a CMC material.

Exemplary CMC materials utilized for such components may include silicon carbide (SiC), silicon, silica, or alumina matrix materials and combinations thereof. Ceramic fibers may be embedded within the matrix, such as oxidation stable reinforcing fibers including monofilaments like sapphire and silicon carbide (e.g., Textron's SCS-6), as well as rovings and yarn including silicon carbide (e.g., Nippon Carbon's NICALON®, Ube Industries' TYRANNO®, and Dow Corning's SYLRAMIC®), alumina silicates (e.g., Nextel's 440 and 480), and chopped whiskers and fibers (e.g., Nextel's 440 and SAFFIL®), and optionally ceramic particles (e.g., oxides of Si, Al, Zr, Y, and combinations thereof) and inorganic fillers (e.g., pyrophyllite, wollastonite, mica, talc, kyanite, and montmorillonite). For example, in certain embodiments, bundles of the fibers, which may include a ceramic refractory material coating, are formed as a reinforced tape, such as a unidirectional reinforced tape. A plurality of the tapes may be laid up together (e.g., as plies) to form a preform component. The bundles of fibers may be impregnated with a slurry composition prior to forming the preform or after formation of the preform. The preform may then undergo thermal processing, such as a cure or burn-out to yield a high char residue in the preform, and subsequent chemical processing, such as melt-infiltration or chemical vapor infiltration with silicon, to arrive at a component formed of a CMC material having a desired chemical composition. In other embodiments, the CMC material may be formed as, e.g., a carbon fiber cloth rather than as a tape.

More specifically, examples of CMC materials, and particularly SiC/Si—SiC (fiber/matrix) continuous fiber-reinforced ceramic composite (CFCC) materials and processes, are described in U.S. Pat. Nos. 5,015,540; 5,330,854; 5,336,350; 5,628,938; 6,024,898; 6,258,737; 6,403,158; and 6,503,441, and U.S. Patent Application Publication No. 2004/0067316. Such processes generally entail the fabrication of CMCs using multiple pre-impregnated (prepreg) layers, e.g., the ply material may include prepreg material consisting of ceramic fibers, woven or braided ceramic fiber cloth, or stacked ceramic fiber tows that has been impregnated with matrix material. In some embodiments, each prepreg layer is in the form of a "tape" comprising the desired ceramic fiber reinforcement material, one or more precursors of the CMC matrix material, and organic resin binders. Prepreg tapes can be formed by impregnating the reinforcement material with a slurry that contains the ceramic precursor(s) and binders. Preferred materials for the precursor will depend on the particular composition desired for the ceramic matrix of the CMC component, for example, SiC powder and/or one or more carbon-containing materials if the desired matrix material is SiC. Notable carbon-containing materials include carbon black, phenolic resins, and furanic resins, including furfuryl alcohol ($C_4H_3OCH_2OH$). Other typical slurry ingredients include organic binders (for example, polyvinyl butyral (PVB)) that promote the flexibility of prepreg tapes, and solvents for the binders (for example, toluene and/or methyl isobutyl ketone (MIBK)) that promote the fluidity of the slurry to enable impregnation of the fiber reinforcement material. The slurry may further contain one or more particulate fillers intended to be present in the ceramic matrix of the CMC component, for example, silicon and/or SiC powders in the case of a Si—SiC matrix. Chopped fibers or whiskers or other materials also may be embedded within the matrix as previously described. Other compositions and processes for producing composite articles, and more specifically, other slurry and prepreg tape compositions, may be used as well, such as, e.g., the processes and compositions described in U.S. Patent Application Publication No. 2013/0157037.

The resulting prepreg tape may be laid-up with other tapes, such that a CMC component formed from the tape comprises multiple laminae, each lamina derived from an individual prepreg tape. Each lamina contains a ceramic fiber reinforcement material encased in a ceramic matrix formed, wholly or in part, by conversion of a ceramic matrix precursor, e.g., during firing and densification cycles as described more fully below. In some embodiments, the reinforcement material is in the form of unidirectional arrays of tows, each tow containing continuous fibers or filaments. Alternatives to unidirectional arrays of tows may be used as well. Further, suitable fiber diameters, tow diameters, and center-to-center tow spacing will depend on the particular application, the thicknesses of the particular lamina and the tape from which it was formed, and other factors. As described above, other prepreg materials or non-prepreg materials may be used as well.

After laying up the tapes or plies to form a layup, the layup is debulked and, if appropriate, cured while subjected to elevated pressures and temperatures to produce a preform. The preform is then heated (fired) in a vacuum or inert atmosphere to decompose the binders, remove the solvents, and convert the precursor to the desired ceramic matrix material. Due to decomposition of the binders, the result is a porous CMC body that may undergo densification, e.g., melt infiltration (MI), to fill the porosity and yield the CMC component. Specific processing techniques and parameters for the above process will depend on the particular composition of the materials. For example, silicon CMC components may be formed from fibrous material that is infiltrated with molten silicon, e.g., through a process typically referred to as the Silcomp process. Another technique of manufacturing CMC components is the method known as the slurry cast melt infiltration (MI) process. In one method of manufacturing using the slurry cast MI method, CMCs are produced by initially providing plies of balanced two-dimensional (2D) woven cloth comprising silicon carbide (SiC)-containing fibers, having two weave directions at substantially 90° angles to each other, with substantially the same number of fibers running in both directions of the weave. The term "silicon carbide-containing fiber" refers to a fiber having a composition that includes silicon carbide, and preferably is substantially silicon carbide. For instance, the fiber may have a silicon carbide core surrounded with carbon, or in the reverse, the fiber may have a carbon core surrounded by or encapsulated with silicon carbide.

Other techniques for forming CMC components include polymer infiltration and pyrolysis (PIP) and oxide/oxide processes. In PIP processes, silicon carbide fiber preforms are infiltrated with a preceramic polymer, such as polysilazane and then heat treated to form a SiC matrix. In oxide/oxide processing, aluminum or alumino-silicate fibers may be pre-impregnated and then laminated into a preselected geometry. Components may also be fabricated from a carbon fiber reinforced silicon carbide matrix (C/SiC) CMC. The C/SiC processing includes a carbon fibrous preform laid up on a tool in the preselected geometry. As utilized in the slurry cast method for SiC/SiC, the tool is made up of graphite material. The fibrous preform is supported by the tooling during a chemical vapor infiltration process at about 1200° C., whereby the C/SiC CMC component is formed. In still other embodiments, 2D, 2.5D, and/or 3D preforms may be utilized in MI, CVI, PIP, or other processes. For example, cut layers of 2D woven fabrics may be stacked in alternating weave directions as described above, or filaments may be wound or braided and combined with 3D weaving, stitching, or needling to form 2.5D or 3D preforms having multiaxial fiber architectures. Other ways of forming 2.5D or 3D preforms, e.g., using other weaving or braiding methods or utilizing 2D fabrics, may be used as well.

Thus, a variety of processes may be used to form CMC gas turbine components, such as a CMC baffle 102 and a CMC attachment bracket 104 of a retention assembly 100, as well as a CMC turbine nozzle 206 of a flowpath assembly 200. Of course, other suitable processes, including variations and/or combinations of any of the processes described above, also may be used to form CMC components for use with the various retention assembly and flowpath assembly embodiments described herein.

As described herein, the present subject matter provides a low temperature cooling source for a metallic support structure of a gas turbine hot gas flowpath, as well as a higher temperature cooling source for components disposed within the flowpath. The low temperature cooling source is a first cooling passage, which receives a first airflow, that is independent of the higher temperature cooling source, which is a second cooling passage that receives a second airflow. Each of the first cooling passage and the second cooling passage is defined by a retention assembly that secures the flowpath components to the metallic support structure. Openings within the metallic support structure allow the first airflow to flow into and out of the first cooling passage, and openings within the retention assembly allow the second airflow to flow into the flowpath and/or into one or more flowpath components. The retention assembly also has features for keeping the first and second cooling passages separate, such that the metallic support structure is shielded from the higher temperature airflow within the second cooling passage, as well as the relatively hot temperatures of the gases flowing through the flowpath. Of course, the present subject matter may have other benefits and advantages as well.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they include structural elements that do not differ from the literal language of the claims or if they include equivalent structural elements with insubstantial differences from the literal language of the claims.

What is claimed is:

1. A retention assembly for a component of a gas turbine engine, comprising:
   an annular baffle;
   an annular attachment bracket comprising the component;
   a first cooling passage defined by the baffle and the attachment bracket, wherein the attachment bracket is attached to a casing of the gas turbine engine; and
   a second cooling passage defined by the baffle and the attachment bracket,
   wherein the first cooling passage is configured to receive a first airflow and the second cooling passage is configured to receive a second airflow, the first airflow having a lower pressure than the second airflow,
   wherein the attachment bracket defines at least two first bracket openings and the casing defines at least two casing openings, and wherein the first bracket openings are aligned with the casing openings for the ingress of the first airflow into and egress of the first airflow from the first cooling passage.

2. The retention assembly of claim 1, wherein an end of the baffle is secured between an end of the attachment bracket and the casing.

3. The retention assembly of claim 1, wherein the attachment bracket defines a bracket opening for the egress of the second airflow from the second cooling passage.

4. The retention assembly of claim 1, wherein the second cooling passage is defined radially inward of the first cooling passage.

5. The retention assembly of claim 1, wherein the baffle, the attachment bracket, and the component are each formed from a ceramic matrix composite material.

6. The retention assembly of claim 1, wherein the baffle comprises a first member and a second member, the first member extending radially and the second member extending axially from the first member.

7. The retention assembly of claim 6, wherein the attachment bracket comprises a first segment, a second segment, and a third segment, the first segment extending axially, the second segment extending radially from the first segment, the third segment extending axially from the second segment.

8. The retention assembly of claim 7, wherein the second segment of the attachment bracket includes an axially extending arm, and wherein the second member of the baffle is in contact with the arm.

9. A retention assembly for a ceramic matrix composite (CMC) component of a gas turbine engine, comprising:
  an annular CMC baffle having a first member and a second member, the first member extending radially and the second member extending axially from the first member;
  an annular CMC attachment bracket comprising the CMC component, the CMC attachment bracket having a first segment, a second segment, and a third segment, the first segment extending axially, the second segment extending radially from the first segment, the third segment extending axially from the second segment;
  a first cooling passage defined by the first and second members of the CMC baffle and the first and second segments of the CMC attachment bracket; and
  a second cooling passage defined by the second member of the CMC baffle and the second and third members of the CMC attachment bracket,
  wherein the first cooling passage is configured to receive a first airflow and the second cooling passage is configured to receive a second airflow, the first airflow having a lower pressure than the second airflow,
  wherein the CMC attachment bracket is attached to a casing of the gas turbine engine, and wherein an end of the CMC baffle is secured between an end of the CMC attachment bracket and the casing,
  wherein the CMC attachment bracket defines at least two first bracket openings and the casing defines at least two casing openings, and wherein the first bracket openings are aligned with the casing openings for the ingress of the first airflow into and egress of the first airflow from the first cooling passage.

10. The retention assembly of claim 9, wherein the second member of the CMC baffle separates the first airflow from the second airflow.

11. The retention assembly of claim 9, wherein the casing is formed from a metallic material.

12. The retention assembly of claim 9, wherein the CMC attachment bracket defines a bracket opening for the egress of the second airflow from the second cooling passage.

13. The retention assembly of claim 9, wherein the second segment of the attachment bracket includes an axially extending arm, and wherein the second member of the baffle is in contact with the arm.

14. A method for cooling a retention assembly for a ceramic matrix composite (CMC) component of a gas turbine engine, the method comprising:
  flowing a first airflow to a first cooling passage defined by a baffle and an attachment bracket of the retention assembly, wherein the attachment bracket is attached to a casing of the gas turbine engine;
  flowing a second airflow to a second cooling passage defined by the baffle and the attachment bracket, the second cooling passage separate from the first cooling passage,
  wherein the first airflow cools radially outward structures of the retention assembly, and
  wherein the attachment bracket comprises the CMC component, and wherein the attachment bracket defines at least two first bracket openings and the casing defines at least two casing openings, and wherein the first bracket openings are aligned with the casing openings for the ingress of the first airflow into and egress of the first airflow from the first cooling passage.

15. The method of claim 14, further comprising:
  installing the retention assembly within a turbine section of the gas turbine engine, the CMC component extending within a flowpath of the turbine section,
  wherein flowing the first airflow to the first cooling passage comprises flowing discharge air from a first location in a compressor section of the gas turbine engine, and
  wherein flowing the second airflow to the second cooling passage comprises flowing discharge air from a second location in the compressor section, the second location downstream of the first location.

16. The method of claim 15, wherein installing the retention assembly within the turbine section comprises bolting the attachment bracket to a casing of the gas turbine engine.

* * * * *